(12) United States Patent
Ochi et al.

(10) Patent No.: US 11,148,480 B2
(45) Date of Patent: Oct. 19, 2021

(54) TIRE ASSEMBLY, TIRE MONITORING SYSTEM, AND TIRE MONITORING METHOD

(71) Applicants: SUMITOMO RUBBER INDUSTRIES, LTD., Kobe (JP); THE SCHOOL CORPORATION KANSAI UNIVERSITY, Suita (JP)

(72) Inventors: Jun Ochi, Kobe (JP); Hiroshi Tani, Suita (JP)

(73) Assignees: SUMITOMO RUBBER INDUSTRIES, LTD., Kobe (JP); THE SCHOOL CORPORATION KANSAI UNIVERSITY, Suita (JP)

(*) Notice: Subject to any disclaimer, the term of this patent is extended or adjusted under 35 U.S.C. 154(b) by 166 days.

(21) Appl. No.: 16/514,706

(22) Filed: Jul. 17, 2019

(65) Prior Publication Data
US 2020/0023693 A1 Jan. 23, 2020

(30) Foreign Application Priority Data
Jul. 18, 2018 (JP) .............................. JP2018-135191

(51) Int. Cl.
*B60C 23/12* (2006.01)
*B60C 23/04* (2006.01)
*B60C 5/22* (2006.01)

(52) U.S. Cl.
CPC ................ *B60C 23/12* (2013.01); *B60C 5/22* (2013.01); *B60C 23/0484* (2013.01)

(58) Field of Classification Search
CPC .. G01M 17/02; G01M 17/021; G01M 17/022; G01M 17/027; G01M 17/025;
(Continued)

(56) References Cited

U.S. PATENT DOCUMENTS

2004/0164558 A1* 8/2004 Adamson ................ B60C 13/00
290/1 R
2016/0159170 A1 6/2016 Kim et al.
(Continued)

FOREIGN PATENT DOCUMENTS

CN 106961228 A 7/2017
JP 2016-88473 A 5/2016
(Continued)

OTHER PUBLICATIONS

Extended European Search Report for European Application No. 19185921.4, dated Nov. 20, 2019.

*Primary Examiner* — Andre J Allen
(74) *Attorney, Agent, or Firm* — Birch, Stewart, Kolasch & Birch LLP

(57) ABSTRACT

Provided is a tire assembly includes a tire, a power generating body disposed inside the tire, and an electronic device that receives supply of power that is output from the power generating body. The power generating body includes a first insulating film, a second insulating film, a first electrode, and a second electrode. The first insulating film has a first surface. The second insulating film has a second surface. The first and second electrodes have conductivity. The power generating body is configured such that a true area of contact between the first surface and the second surface changes according to deformation of the tire.

19 Claims, 12 Drawing Sheets

(58) Field of Classification Search
CPC .... G01M 17/024; G01M 17/10; G01M 1/045; G01M 7/08; G01M 17/0076; G01M 17/013; G01M 17/03; G01M 17/04; G01M 17/06; G01M 17/08; G01M 1/02; G01M 1/12; G01M 1/16; G01M 1/225; G01M 3/04; G01M 3/40; G01M 5/0091; G01M 7/02; G01M 99/00; G01M 99/002; B60C 23/0494; B60C 2019/004; B60C 23/0493; B60C 23/064; B60C 19/00; B60C 23/04; B60C 23/0488; B60C 23/0498; B60C 23/0496; B60C 23/0408; B60C 23/041; B60C 23/0411; B60C 23/06; B60C 23/20; B60C 11/246; B60C 23/0486; B60C 23/061; B60C 11/243; B60C 99/00; B60C 11/0083; B60C 13/003; B60C 2009/2038; B60C 23/004; B60C 23/02; B60C 23/0401; B60C 23/0406; B60C 23/0416; B60C 23/0433; B60C 23/0455; B60C 23/0459; B60C 23/0474; B60C 23/0489; B60C 23/0491; B60C 25/002; B60C 25/005; B60C 25/007; B60C 29/02; B60C 3/04; B60C 99/006; B60C 11/0332; B60C 11/24; B60C 13/001; B60C 13/02; B60C 15/0036; B60C 17/02; B60C 2009/0071; B60C 2009/2022; B60C 2200/02; B60C 2200/06; B60C 2200/065; B60C 23/00; B60C 23/001; B60C 23/003; B60C 23/007; B60C 23/008; B60C 23/0413; B60C 23/0427; B60C 23/0447; B60C 23/0454; B60C 23/0457; B60C 23/0462; B60C 23/0471; B60C 23/0472; B60C 23/0476; B60C 23/0479; B60C 23/0484; B60C 23/065; B60C 23/066; B60C 23/10; B60C 25/0548; B60C 25/056; B60C 25/132; B60C 25/138; B60C 29/005; B60C 9/005; B60C 9/18; B60C 9/1807; B60C 9/20; B60C 9/28; G01L 17/00; G01L 17/005; G01L 19/0645; G01L 19/147; G01L 1/16; G01L 1/18; G01L 7/187; G01L 9/0052; G01L 9/008
USPC .................................................. 73/146–146.8
See application file for complete search history.

(56) References Cited

U.S. PATENT DOCUMENTS

2018/0145244 A1\* 5/2018 Otagiri ................ H01L 41/1132
2018/0326801 A1\* 11/2018 So ......................... B60C 23/041

FOREIGN PATENT DOCUMENTS

KR  10-2016-0106358 A  9/2016
WO  WO 2015/037244 A1  3/2015

\* cited by examiner

TIRE ASSEMBLY, TIRE MONITORING SYSTEM, AND TIRE MONITORING METHOD

CROSS REFERENCE TO RELATED APPLICATIONS

This application claims a priority to Japanese Patent Application No. 2018-filed on Jul. 18, 2018, which is hereby incorporated by reference in its entirety.

The present invention relates to a tire assembly, a tire monitoring system, and a tire monitoring method.

JP 2016-88473A discloses a tire assembly in which a power generating body and an electronic apparatus are incorporated in a tire. The power generating body is configured to convert mechanical vibration energy of the tire into electric energy utilizing an electrostatic effect, and supply power to the electronic apparatus.

JP 2016-88473A is an example of related art.

SUMMARY OF THE INVENTION

In the power generating body disclosed in JP 2016-88473A, a pair of opposing electrode structures come into contact with and separate from each other due to vibrations of the tire, and thus generate static electricity. Thus, a fixing portion for supporting the pair of electrode structures separated from each other and a configuration in which the power generating body is embedded in rubber of the tire are required, and thus the structure tends to be complicated.

An object of the present invention is to provide a tire assembly including a power generating body with a simple structure, a monitoring system for monitoring the tire utilizing this, and a tire monitoring method.

A tire assembly according to a first aspect of the present invention includes a tire configured to mounted on a wheel, a power generating body that is disposed inside the tire, and an electronic device configured to receive supply of power that is output from the power generating body. The power generating body includes a first insulating film, a second insulating film, a first electrode, and a second electrode. The first insulating film has a first surface. The second insulating film has a second surface that faces the first surface and is in contact with the first surface. The first electrode has conductivity and is in contact with a back surface of the first surface of the first insulating film. The second electrode has conductivity and is in contact with a back surface of the second surface of the second insulating film. The power generating body is configured such that a true area of contact between the first surface and the second surface changes according to deformation of the tire. The first insulating film and the second insulating film are configured such that one of the first insulating film and the second insulating film is positively charged and the other of the first insulating film and the second insulating film is negatively charged due to the true area of contact changing. A voltage is generated across the first electrode and the second electrode due to the first insulating film and the second insulating film being charged, and the power generating body outputs power.

A tire assembly according to a second aspect of the present invention is the tire assembly according to the first aspect, in which the electronic device includes a communication apparatus that is capable of data communication with an external apparatus.

A tire assembly according to a third aspect of the present invention is the tire assembly according to the first aspect or the second aspect, in which the electronic device includes a detection apparatus configured to detect data regarding a state of the tire.

A tire assembly according to a fourth aspect of the present invention is the tire assembly according to any of the first aspect to the third aspect, in which the electronic device includes a microcontroller configured to control the electronic device.

A tire assembly according to a fifth aspect of the present invention is the tire assembly according to any of the first aspect to the fourth aspect, and further includes a dampproof film bag in which the power generating body is enclosed.

A tire assembly according to a sixth aspect of the present invention is the tire assembly according to any of the first aspect to the fifth aspect, and further includes a storage battery configured to store power that is output by the power generating body. The electronic device receives supply of power stored in the storage battery.

A tire assembly according to a seventh aspect of the present invention is the tire assembly according to any of the first aspect to the sixth aspect, and further includes a weight that is disposed to press the power generating body such that the first insulating film and the second insulating film approach each other.

A tire assembly according to an eighth aspect of the present invention is the tire assembly according to any of the first aspect to the sixth aspect, in which the electronic device is disposed to press the power generating body such that the first insulating film and the second insulating film approach each other.

A tire assembly according to a ninth aspect of the present invention is the tire assembly according to the sixth aspect, in which the storage battery is disposed to press the power generating body such that the first insulating film and the second insulating film approach each other.

A tire monitoring system according to a tenth aspect of the present invention includes the tire assembly according to the second aspect and an external control apparatus configured to be capable of data communication with the communication apparatus. The communication apparatus transmits, to the external control apparatus, at least one piece of output data of a voltage and a current that are output by the power generating body, and a physical quantity that is based on at least one of the voltage and the current. The external control apparatus monitors information regarding the tire based on the output data received from the communication apparatus.

A tire monitoring system according to an eleventh aspect of the present invention is the tire monitoring system according to the tenth aspect, in which the information regarding the tire includes at least one of information regarding a rotational speed of the tire, information regarding abrasion of the tire, and information regarding a state of a road on which a vehicle on which the tire is mounted is travelling.

A tire monitoring system according to a twelfth aspect of the present invention is the tire monitoring system according to the tenth aspect or the eleventh aspect, in which the external control apparatus is installed in a vehicle that includes the tire assembly.

A tire monitoring method according to a thirteenth aspect of the present invention includes the following.

Prepare a vehicle on which the tire assembly according to any of the first aspect to the ninth aspect is mounted.

Collect at least one piece of output data of a voltage and a current that are output by the power generating body while the vehicle is travelling, and a physical quantity that is based on at least one of the voltage and the current.

Monitor information regarding the tire based on the collected output data.

According to the present invention, a tire assembly including a power generating body with a simple structure is provided. The power generating body generates an electromotive force utilizing deformation of a tire. Thus, it is possible to supply power to an electronic device such as a detection apparatus built into the tire. Furthermore, by associating output data such as a voltage or a current that is output by the power generating body with a state of a tire, and analyzing the state, it is possible to acquire various pieces of information regarding the tire. Accordingly, a tire monitoring system and a tire monitoring method utilizing a tire assembly of the present invention are provided.

BRIEF DESCRIPTION OF THE DRAWINGS

FIG. 9 is a diagram showing a force that a power generating body incorporated in a tire assembly is subjected to.

EMBODIMENTS OF THE INVENTION

Hereinafter, a tire assembly according to one embodiment of the present invention, a tire monitoring system and a monitoring method utilizing the same will be described with reference to the drawings.

1. Overall Configuration of Tire Monitoring System

Figure 1:
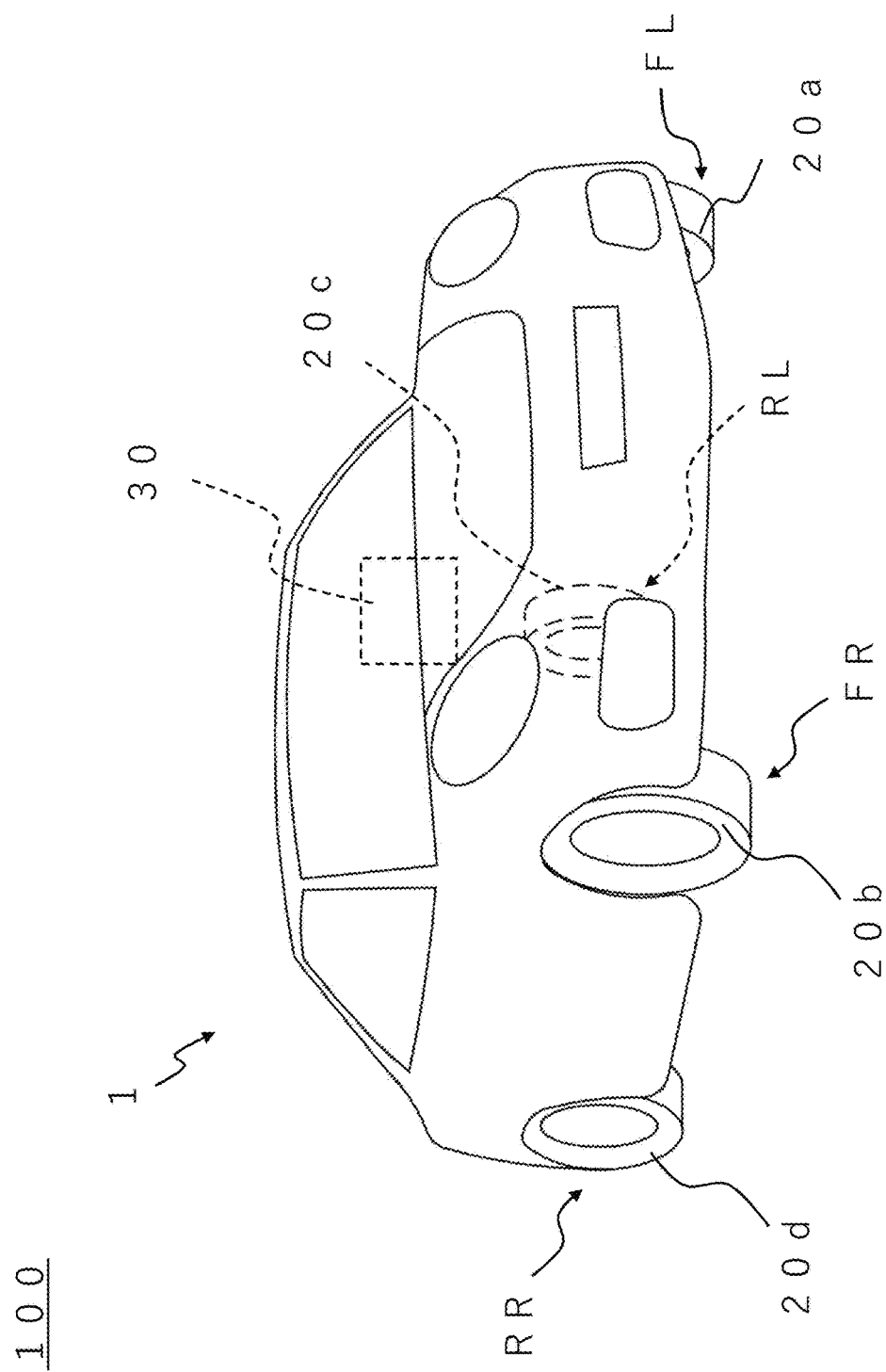
FIG. 1 is a diagram showing the overall configuration of a tire monitoring system according to one embodiment of the present invention.

FIG. 1 is a diagram showing the overall configuration of a tire monitoring system 100 (sometimes simply referred to as "system 100" hereinafter) according to one embodiment of the present invention. The system 100 is a system for monitoring tires, the system 100 including a control apparatus 30 installed in a vehicle 1 and tire assemblies 20 mounted on wheels of the vehicle 1. The system 100 functions as a TPMS (Tire Pressure Monitoring System), for example. The vehicle 1 is a four-wheel vehicle, and includes a front-left wheel FL, a front-right wheel FR, a rear-left wheel RL, and a rear-right wheel RR. Tire assemblies 20a to 20d are mounted on the wheels FL, FR, RL, and RR. Wheels to which the tire assemblies 20a to 20d are attached are different from each other, but the tire assemblies 20a to 20d have the same structure and function. Thus, the tire assemblies 20a to 20d are sometimes referred to as a "tire assembly 20" without being distinguished from each other.

Figure 2:
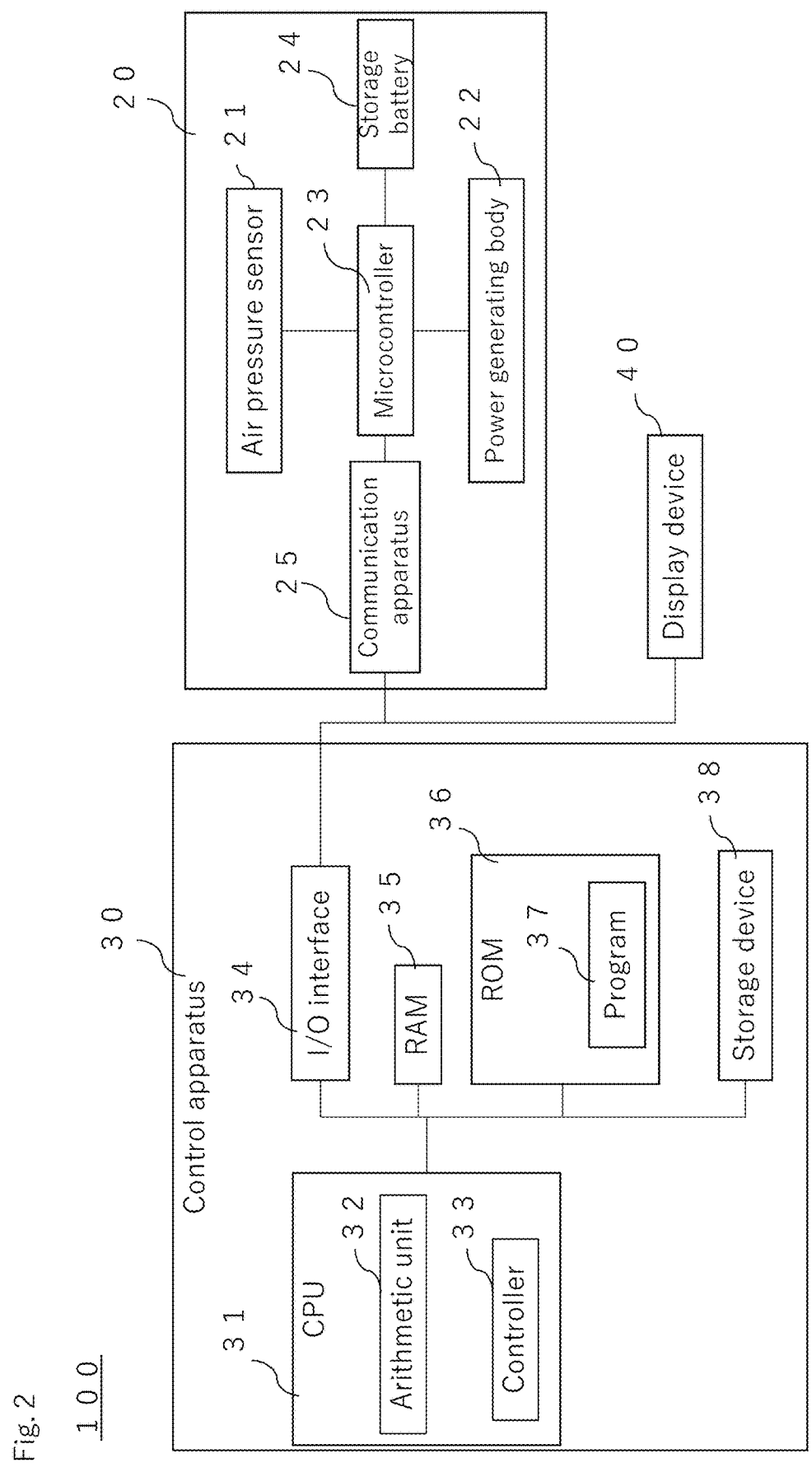
FIG. 2 is a block diagram showing an electrical configuration of a monitoring system.

FIG. 2 is a block diagram showing an electrical configuration of the system 100. The control apparatus 30 is a unit configured to control various processes for monitoring information regarding tires 26 (see FIGS. 3 and 4) included in the tire assemblies 20, and includes a CPU 31, an I/O interface 34, a RAM 35, a ROM 36, and a non-volatile rewritable storage device 38. The I/O interface 34 is a communication apparatus for performing wired or wireless communication with external apparatuses such as a display device 40 and the tire assemblies 20. A program 37 for controlling operations of the system 100 is stored in the ROM 36. The CPU 31 virtually operates as an arithmetic unit 32 and a controller 33 by reading out the program 37 from the ROM 36 and executing the readout program 37. Detailed operations of the units will be described later. The storage device 38 is constituted by a hard disk, a flash memory, and the like. Note that the program 37 may also be stored in the storage device 38 instead of the ROM 36. Also, the RAM 35 and the storage device 38 are used in calculation performed by the CPU 31 as appropriate. Also, the control apparatus 30 may be connected to a cloud computing service via a network.

The mode of the display device 40 is not limited as long as various types of information can be displayed and communicated to a user. For example, the display device 40 can be realized using any mode such as a liquid crystal monitor, a liquid crystal display element, an organic EL display, or a plasma display. Although a position at which the display device 40 is attached may be selected as appropriate, it is desirable to provide the display device 40 at a position that can be easily recognized by a driver, such as in an instrument panel, for example. If the control apparatus 30 is connected to a car navigation system, a monitor for car navigation may also be used as the display device 40, or a multi-information display may also be used as the display device 40.

Figure 3:
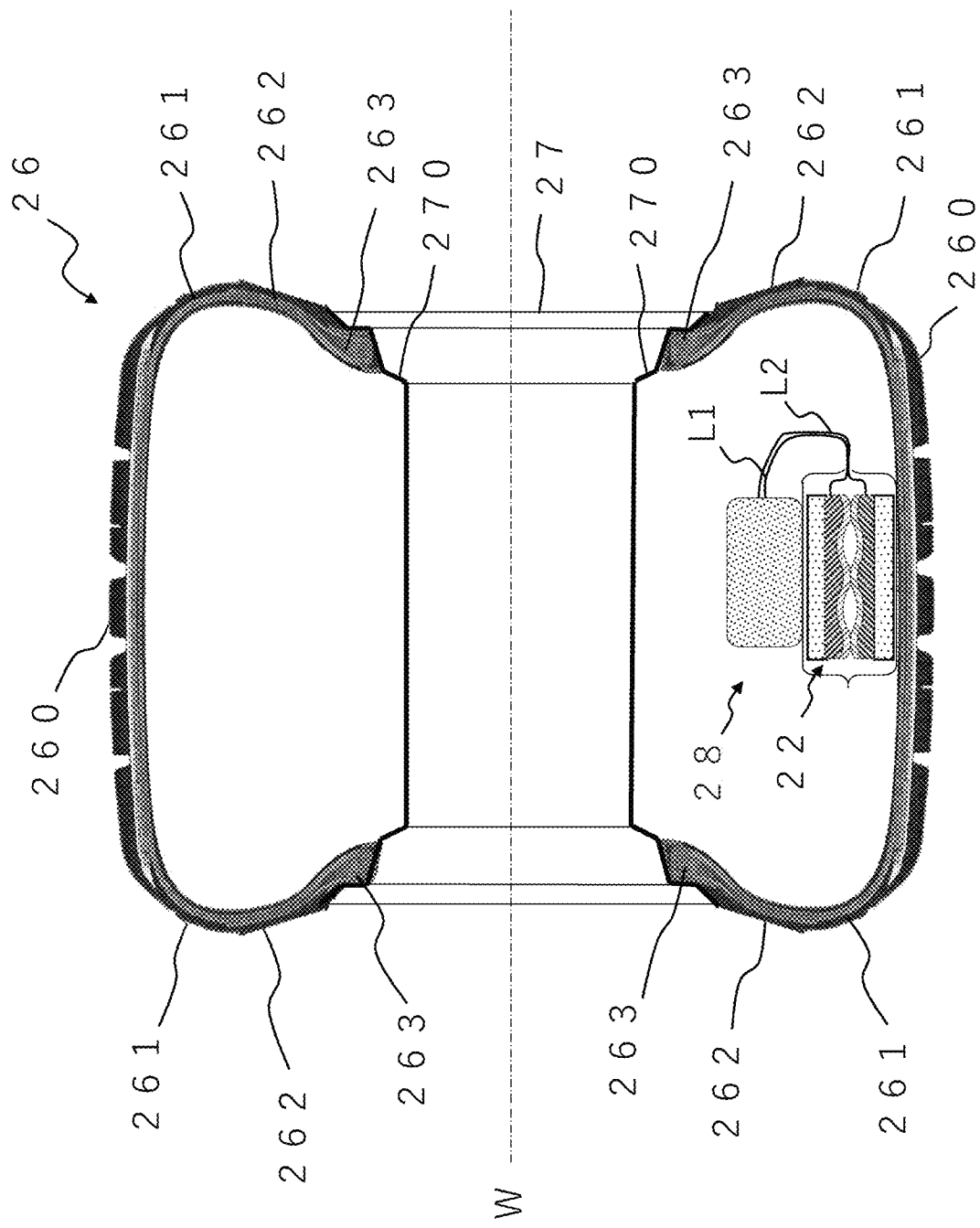
FIG. 3 is a cross-sectional diagram showing a configuration of a tire assembly.

FIG. 3 is a cross-sectional diagram showing the configuration of the tire assembly 20. The tire assembly 20 includes the tire 26 mounted on the wheel of the vehicle 1, and a power generating body 22 and a sensor module 28 that are disposed inside the tire 26. As will be described later, the power generating body 22 is configured to output power utilizing deformation of the tire 26. The sensor module 28 includes electronic devices configured to receive supply of power output from the power generating body 22. The electronic devices are the detection apparatus, a microcontroller 23, and a communication apparatus 25 (including an antenna) in the present embodiment (see FIGS. 2 and 5). The detection apparatus is an apparatus configured to detect data regarding the state of the tire 26, and is an air pressure sensor 21 configured to detect the air pressure of the internal portion of the tire 26 in the present embodiment. The communication apparatus 25 is capable of data communication with an apparatus located outside the sensor module 28. The microcontroller 23 controls operations of the air pressure sensor 21 and the communication apparatus 25. The air pressure sensor 21, the microcontroller 23, and the communication apparatus 25 are driven by receiving the supply of power output from the power generating body 22.

Data regarding the air pressure of the tire 26 that was detected by the air pressure sensor 21 is stored in a storage unit in the microcontroller 23, and transmitted to the control apparatus 30 by the communication apparatus 25 at predetermined intervals. As will be described later, data received by the control apparatus 30 is processed by the arithmetic unit 32, and whether or not the pressure of the tire 26 has decreased is determined based on the result. The controller 33 controls operations of the units in the system 100 according to the determination.

The sensor module 28 further includes the storage battery 24 (see FIG. 5). Power output by the power generating body 22 is stored in the storage battery 24 via the microcontroller 23. The air pressure sensor 21, the microcontroller 23, and the communication apparatus 25 receive a supply of power stored in the storage battery 24. Note that a rectifier configured to convert an alternating electric current into a direct electric current is in accessory to the storage battery 24.

As will be described later, at least one piece of data of a voltage and a current that are output by the power generating body 22, and a physical quantity that is based on at least one of the voltage and the current can be utilized as data for monitoring information regarding the tire 26. That is, the power generating body 22 not only functions as a power supply source but also as a sensor. In this case, a detection circuit (not shown) formed in the microcontroller 23 detects a voltage or a current output by the power generating body 22. The detected piece of data is stored in the storage device in the microcontroller 23, and transmitted to the control apparatus 30 by the communication apparatus 25 at predetermined intervals. Note that output data transmitted from the communication device 25 to the control apparatus 30 may not be the detected data, and may also include data regarding a physical quantity (for example, data regarding power) that is based on at least one of a voltage and a current, instead of the detected data or in addition to the detected data. The output data received by the control apparatus 30 is analyzed by the arithmetic unit 32 using a predetermined algorithm, and information regarding the rotational speed (wheel speed) of the tire 26, the abrasion state of the tire 26, and the state of a road on which the vehicle 1 is travelling is acquired. The acquired pieces of information are used by the controller 33 to control the system 100.

2. Configuration of Tire Assembly

Hereinafter, a detailed configuration of the tire assembly 20 will be described with reference to FIG. 3. An axis W indicates a rotation axis of the wheel to which the tire assembly 20 is attached, and when the tire assembly 20 is attached to the wheel, the tire assembly 20 rotates about the axis W. The tire assembly 20 includes the tire 26 mounted on the wheel of the vehicle 1. The tire 26 is detachably fixed to a wheel 27. The wheel 27 is made of a metal material, and transmits rotations of an engine to the tire assembly 20. A wheel rim 270 is formed at a circumferential edge portion of the wheel 27. The tire 26 is made of an elastic material such as rubber or a thermoplastic elastomer, and has a tread portion 260, shoulder portions 261, sidewall portions 262, and bead portions 263. The tread portion 260 is a portion that defines a side circumferential surface of the tire 26 with respect to the axis W, and comes into contact with a road surface, generates friction, and thus moves the vehicle 1 forward. Each shoulder portion 261 is adjacent to the tread portion 260 and a sidewall portion 262. The sidewall portions 262 are adjacent to the shoulder portions 261 respectively, and bend to absorb an impact from a road surface, and allow deflection. The bead portions 263 have a built-in bead wire, and are fixed to the wheel rim 270.

As described above, the tire assembly 20 includes the sensor module 28 disposed inside the tire 26. The sensor module 28 is electrically connected to the power generating body 22 via lead wires L1 and L2. As shown in FIG. 3, the sensor module 28 of the present embodiment is fixed to an upper surface of the power generating body 22 in a manner of being stacked on the power generating body 22. In other words, the sensor module 28 is fixed to the power generating body 22 such that the sensor module 28 is disposed inward in a radial direction with respect to the axis W, and the power generating body 22 is disposed outward in the radial direction with respect to the axis W.

Figure 4:
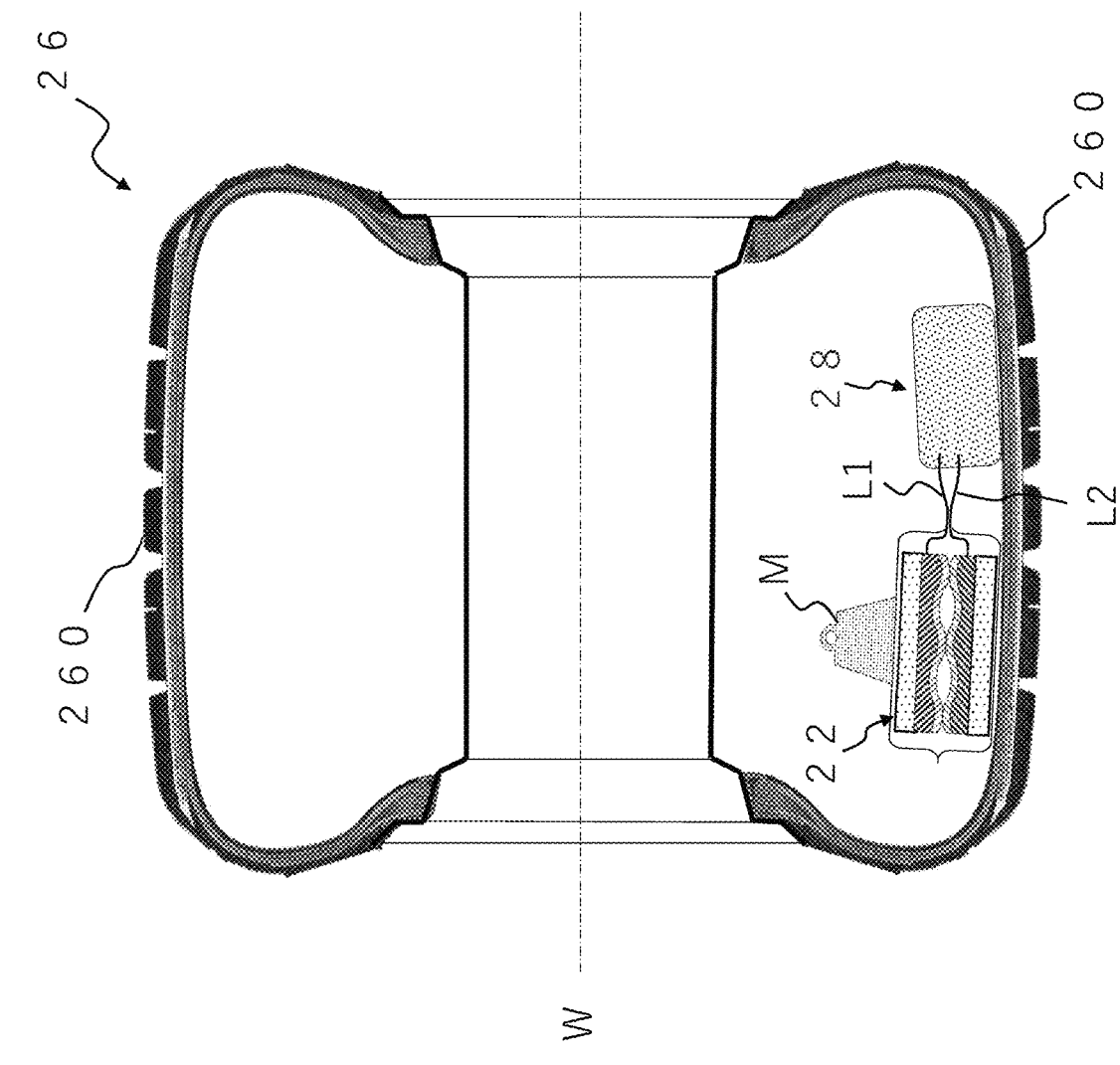
FIG. 4 is a cross-sectional diagram showing a configuration of a tire assembly according to another embodiment.

Note that locations at which the power generating body 22 and the sensor module 28 are disposed are not limited to an inner side surface of the tread portion 260 as long as deformation of the tire 26 is transmitted to the power generating body 22. For example, the inner side surface of a shoulder portion 261 and the inner side surface of a sidewall portion 262 may also be selected. Also, the sensor module 28 may not be fixed to the power generating body 22, and a relative positional relationship therebetween may be selected as appropriate. For example, as shown in FIG. 4, the sensor module 28 and the power generating body 22 may be disposed flush with the inner side surface of the tread portion 260. However, if the sensor module 28 is not fixed to the upper surface of the power generating body 22, it is desirable to further dispose a weight M in the tire 26 to press the power generating body 22 as the tire assembly 20 rotates. The weight M will be described later.

Figure 5A:
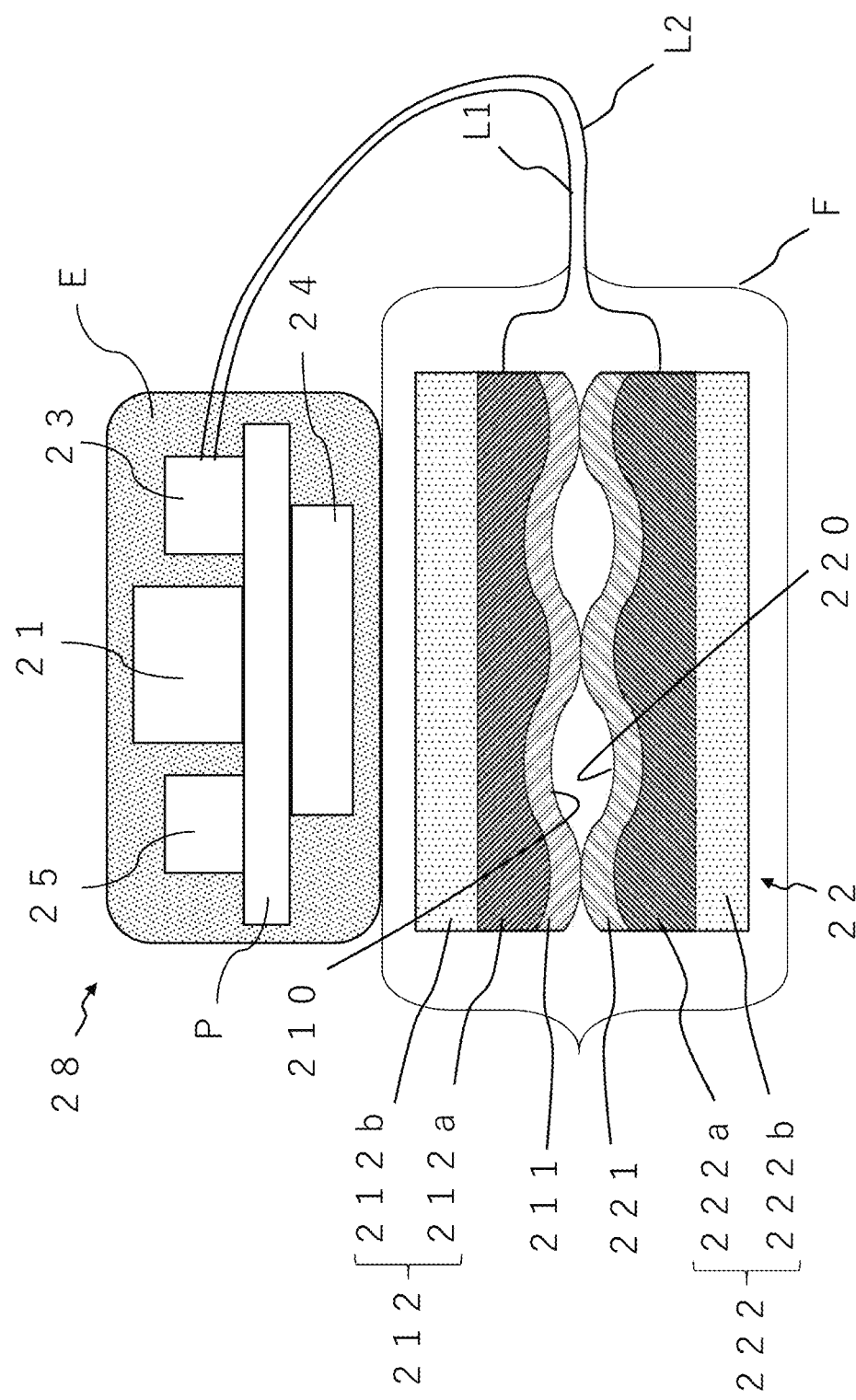
FIG. 5A is a diagram showing the overall configuration of a power generating body and a sensor module.

FIG. 5A shows a detailed configuration of the power generating body 22 and the sensor module 28. The sensor module 28 includes the air pressure sensor 21, the microcontroller 23, the storage battery 24, and the communication apparatus 25 that are mutually electrically connected via a printed wiring board P. The lead wires L1 and L2 are connected to the microcontroller 23. The printed wiring board P, the air pressure sensor 21, the microcontroller 23, the storage battery 24, the communication apparatus 25 are integrally sealed using an epoxy resin E. The lead wires L1 and L2 pass through the epoxy resin E, extend to the outside of the epoxy resin E, and are respectively connected to a first electrode 212 and a second electrode 222 of the power generating body 22, which will be described later.

The tire assembly 20 further includes a dampproof film bag F and the power generating body 22 is enclosed in this film bag F under a reduced pressure (see FIG. 5A). The power generating body 22 includes a first insulating film 211, a second insulating film 221, the first electrode 212, and the second electrode 222. The lead wires L1 and L2 are respectively connected to the first electrode 212 and the second electrode 222. The lead wires L1 and L2 extend to the outside of the film bag F, and are electrically connected to the microcontroller 23. Note that the power generating body 22 need not be enclosed in the film bag F under a reduced pressure, and the power generating body 22 may be simply enclosed in the film bag F.

The power generating body 22 generates power utilizing the principle below. When two different types of materials (insulating films) come into contact with each other, charges move between contact surfaces of the insulating films that are in contact with each other. That is, electrons move from an insulating film on a more positive polarity side to an insulating film on a more negative polarity side in triboelectric series. Next, when the insulating films separate from each other, most of the electrons that have moved from one of the insulating films to the other insulating film remain in the insulating film to which they have moved, and the one of the insulating films is positively charged and the other insulating film is negatively charged. As a result, an electromotive force is generated between the two insulating films. Note that the insulating film may also be similarly charged through charge transfer by applying pressure to insulating films whose portions are in contact with each other such that the insulating films further come into contact with each other, and then removing the pressure. That is, even if portions of the insulating films are in contact with each other at the beginning, an electromotive force is generated by changing the average distance between contact surfaces of the insulating films that are in contact with each other (average surface interval). If unevenness is added to the contact surfaces of the insulating films, the average surface interval of the contact surfaces is relatively large in a state in which pressure is not applied to the insulating films. Next, if pressure is applied such that the insulating films approach each other, the shapes of the contact surfaces of the insulating films change, and the average surface interval decreases. As a result, if pressure is removed, the unevenness of the contact surfaces returns and the average surface interval increases, and thus a high-voltage charge is induced by charges of the charged insulating films in the electrodes that are in contact with the insulating films. In this manner, one of the electrodes is positively charged, and the other electrode is negatively charged. Note that the further apart the materials that constitute two types of insulating films are from each other in the triboelectric series, the more the charge amount increases. Herein, a change in the average surface interval between the contact surfaces is equivalent to a change in the true contact area of the contact surfaces. That is, a decrease in the average surface interval is equivalent to an increase in the true area of contact, and an increase in the average surface interval is equivalent to a decrease in the true area of contact.

The first insulating film 211 has a first surface 210, and the second insulating film 221 has a second surface 220. The second surface 220 faces the first surface 210 and is in contact with the first surface 210. The true area of contact between the first surface 210 and the second surface 220 is configured to change according to deformation of the tire 26. The first insulating film 211 and the second insulating film 221 are made of materials that are separated from each other in the triboelectric series. Thus, if the true area of contact between the first surface 210 and the second surface 220 changes due to deformation of the tire 26, one of the first insulating film 211 and the second insulating film 221 is positively charged, and the other is negatively charged. For example, if the first insulating film 211 is positively charged when the true area of contact changes, the second insulating film 221 is negatively charged. In contrast, if the first insulating film 211 is negatively charged when the true area of contact changes, the second insulating film 221 is positively charged. With this configuration, a structure for supporting the first insulating film 211 and the second insulating film 221 separated from each other, or a configuration in which the power generating body 22 is incorporated inside the rubber of the tire 26 is not required. As a result, the power generating body 22 is capable of generating power using a simple structure.

The first surface 210 and the second surface 220 each have an uneven shape. Thus, although the first surface 210 and the second surface 220 are partially in contact with each other, there are portions where the first surface 210 and the second surface 220 are not in contact with each other. When deformation of the tire 26 is transmitted to the power generating body 22, the first insulating film 211 and the second insulating film 221 operate as will be described later, and an inductive charge is generated. It is desired that at least one of the first surface 210 and the second surface 220 has a ten-point average roughness of 100 µm or more and 2 mm or less. Note that a method for measuring a ten-point average roughness conforms to JIS B 0601: 2001.

The flat plate-shaped first electrode 212 is in contact with the back surface of the first surface 210 of the first insulating film 211. The first electrode 212 includes a conductive film 212a and an insulating base material 212b, and the surface of the base material 212b is covered by the conductive film 212a. The conductive film 212a is made of a conductive material such as Ag (silver) or Cu (copper). The base material 212b is made of a flexible material such as rubber or elastomer. Thus, the entire first electrode 212 has flexibility, and can deform following deformation acting on the power generating body 22 to some extent. The flat plate-shaped second electrode 222 is in contact with the back surface of the second surface 220 of the second insulating film 221. The second electrode 222 includes a conductive film 222a and an insulating base material 222b, and the surface of the base material 222b is covered by the conductive film 222a. The conductive film 222a is made of a conductive material such as Ag (silver) or Cu (copper). The base material 222b is made of a flexible material such as rubber or elastomer. Thus, the entire second electrode 222 has flexibility, and can deform following deformation acting on the power generating body 22 to some extent. Note that a configuration may be adopted in which either one of the first electrode 212 and the second electrode 222 does not include a base material, or either one of them may be made of an elastomer. The first electrode 212 and the second electrode 222 are respectively electrically connected to the microcontroller 23 via the lead wires L1 and L2. Accordingly, a dielectric charge is induced from the power generating body 22 to the microcontroller 23, and a current flows through an electric circuit in the microcontroller 23.

One of the first insulating film 211 and the second insulating film 221 that is positively charged is desirably made of diamond-like carbon (DLC), and the other of the first insulating film 211 and the second insulating film 221 that is negatively charged is desirably an insulating film containing a fluorocarbon organic compound as the main component. DLC has high hardness and a low coefficient of friction, and thus insulating films are unlikely to undergo abrasion due to come into frictional contact with each other. That is, it is unlikely that unevenness of surfaces of insulating films will be subject to abrasion, and thus it is possible to maintain the power generation performance of the power generating body 22 for a long time. Also, an insulating film containing a fluorocarbon organic compound as the main component has high lubricity, and thus is capable of suppressing abrasion of the first surface 210 and the second surface 220. In addition, examples of materials constituting the first insulating film 211 and the second insulating film 221 include perfluoropolyether, polymethyl methacrylate, nylon, polyvinyl alcohol, polyester, polyisobutylene, polyurethane (PU), polyethylene terephthalate, polyvinyl butyral, polychloroprene, natural rubber, polyacrylonitrile, polydiphenol carbonate, chlorinated polyether, polyvinylidene chloride, polystyrene, polyethylene, polypropylene, polyimide, polyvinyl chloride, polydimethylsiloxane, polytetrafluoroethylene, copolymers of ethylene tetrafluoride and propylene hexafluoride, and copolymers of tetrafluoroethylene and hexafluoropropylene (FEP).

It is desired that at least one of the first insulating film 211 and the second insulating film 221 is configured to have a thickness of 20 µm or less. Also, it is more desired that both the first insulating film 211 and the second insulating film 221 are configured to each have a thickness of 20 µm or less.

There is no particular limitation on the material that constitutes the film bag Fi as long as the material has the property of blocking water vapor. For example, a film material obtained through vapor deposition of aluminum or copper on a surface of a base material made of a plastic film may be used. In the inner portion of the tire assembly 20, the relative humidity changes due to changes in the temperature in the tire assembly 20, water vapor is generated, and the generated water vapor influences operations of the power generating body 22 in some cases. The film bag Fi blocks water vapor generated in the tire assembly 20 from the power generating body 22, and limits the influence of the water vapor on the power generating body 22.

Figure 5B:
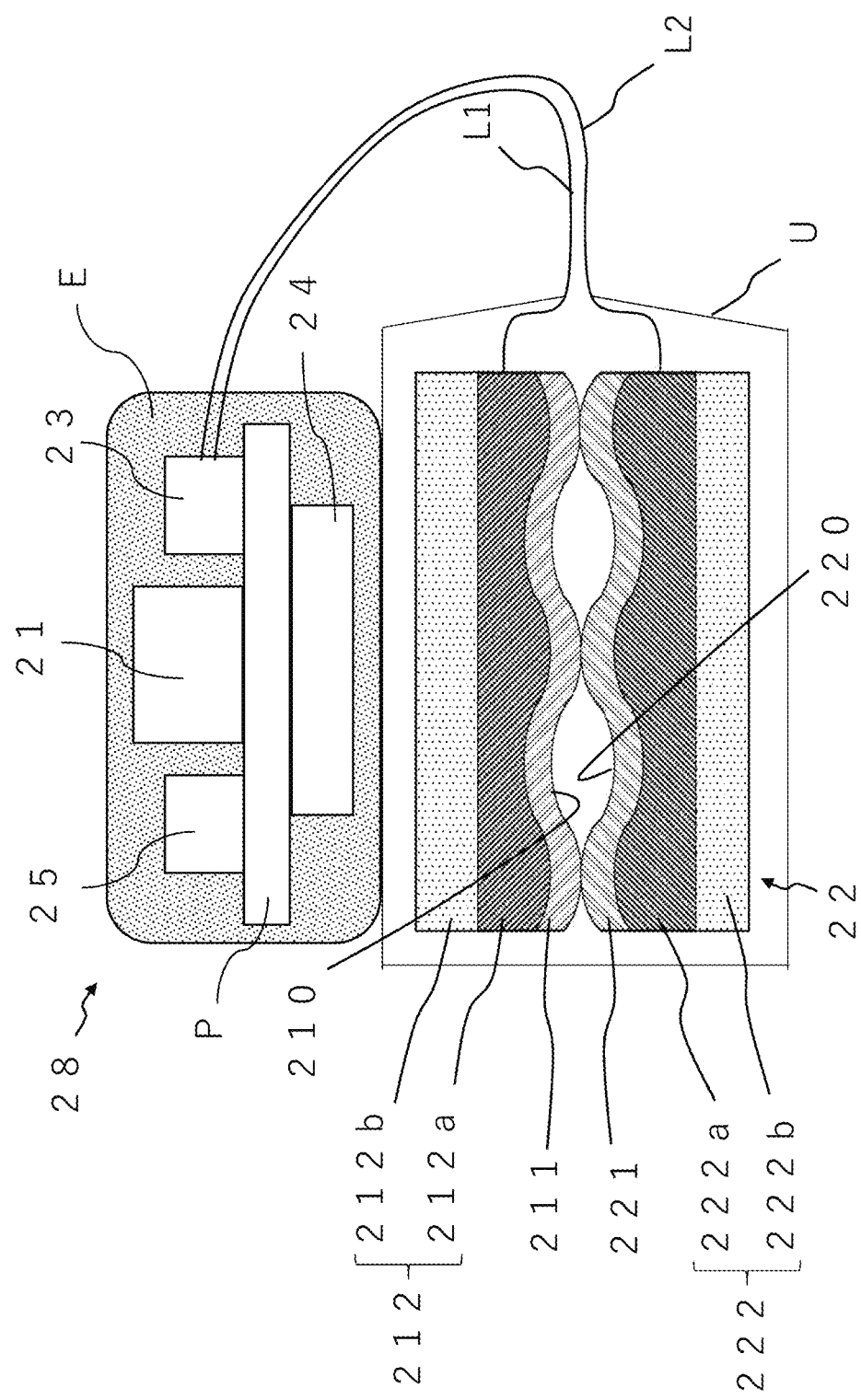
FIG. 5B is a diagram showing another example of the overall configuration of a power generating body and a sensor module.

The tire assembly 20 may include a flexible sealing material U by which the power generating body 22 is sealed, instead of the film bag F (see FIG. 5B). Materials with low hardness, a low elastic modulus, and a low water absorption rate are preferable as the flexible sealing material U. The power generating body 22 may be sealed using the flexible sealing material U, or may be enclosed in an enclosing cover produced using the flexible sealing material U.

More specifically, the flexible sealing material U preferably has a Shore hardness (JIS K 6253) of 5 to 50, and more preferably has a Shore hardness of 20 to 40. Also, the flexible sealing material U preferably has a water absorption rate (JIS K 6911) of 0.5% or less, and more preferably has a water absorption rate of 0.2% or less. Non-limiting examples of the flexible sealing material U include a heat-resistant urethane resin (UA-3001) for waterproof insulation and a urethane resin (UE-503) produced by Sanyu Rec. Co., Ltd.

As described above, in the present embodiment, the sensor module 28 is fixed to the upper surface of the power generating body 22, and thus the sensor module 28 functions as a weight. That is, the air pressure sensor 21, the microcontroller 23, the storage battery 24, and the communication apparatus 25 press the power generating body 22 such that the first insulating film 211 and the second insulating film 221 approach each other. When the tire assembly 20 rotates, a centrifugal force is applied to the sensor module 28, the power generating body 22 is pressed against the tire 26 by the sensor module 28, pressure is applied such that the first insulating film 211 and the second insulating film 221 approach each other, and thus power is generated. However, as shown in FIG. 4, the sensor module 28 may also be disposed at a position at which the sensor module 28 does not function as a weight for assisting power generation by the power generating body 22. In this case, as shown in FIG. 4, it is desirable to dispose, separately from the sensor module 28, a weight M for pressing the power generating body 22 such that the first insulating film 211 and the second insulating film 221 approach each other. The weight M may be any object as long as the weight M can apply pressure such that the first insulating film 211 and the second insulating film 221 come approach each other, and the method for fixing the weight M to the tire assembly 20 may be selected as appropriate.

The tire 26 according to the present embodiment is a tubeless tire that does not include a tube. However, if the tire assembly 20 is a tube tire including the tire 26 and a tube, similarly to the weight M, it is possible to cause the tube to function as an element for assisting power generation by the power generating body 22 by disposing the power generating body 22 between the tire 26 and the tube. That is, it is possible to press the power generating body 22 using the tube such that the air pressure in the tube is applied to press the power generating body 22 against the tire 26, and the first insulating film 211 and the second insulating film 221 approach each other.

3. Operations of Power Generating Body

Hereinafter, operations of the power generating body 22 will be described. As shown in FIGS. 5A and 5B, the first surface 210 of the first insulating film 211 and the second surface 220 of the second insulating film 221 are in contact with each other at portions of the uneven shapes in a state where the tire assembly 20 is stationary. At this time, because the tire 26 is stationary, the true area of contact hardly changes, and even if a potential difference occurs between the first electrode 212 and the second electrode 222, an absolute value thereof is relatively small.

When the tire assembly 20 rotates on a road surface, a portion of the tread portion 260 that is in contact with the road surface is subjected to an impact from the road surface. When this impact is transmitted to the entire tire 26, in order to absorb the impact, the sidewall portions 262 in particular deflect and the entire tire 26 deforms. Then, the sidewall portions 262 attempt to return from deformation, but are again subjected to an impact from the road surface via another portion of the tread portion 260. In this manner, the tire 26 repeats expansion/contraction deformation as a whole. The expansion/contraction deformation of the tire 26 is transmitted to the power generating body 22 fixed to the inner side surface of the tread portion 260. The power generating body 22 deforms according to the transmitted expansion/contraction deformation of the tire 26. As a result, the first insulating film 211 and the second insulating film 221 come close to and separate from each other, and the true area of contact changes.

Figure 6:
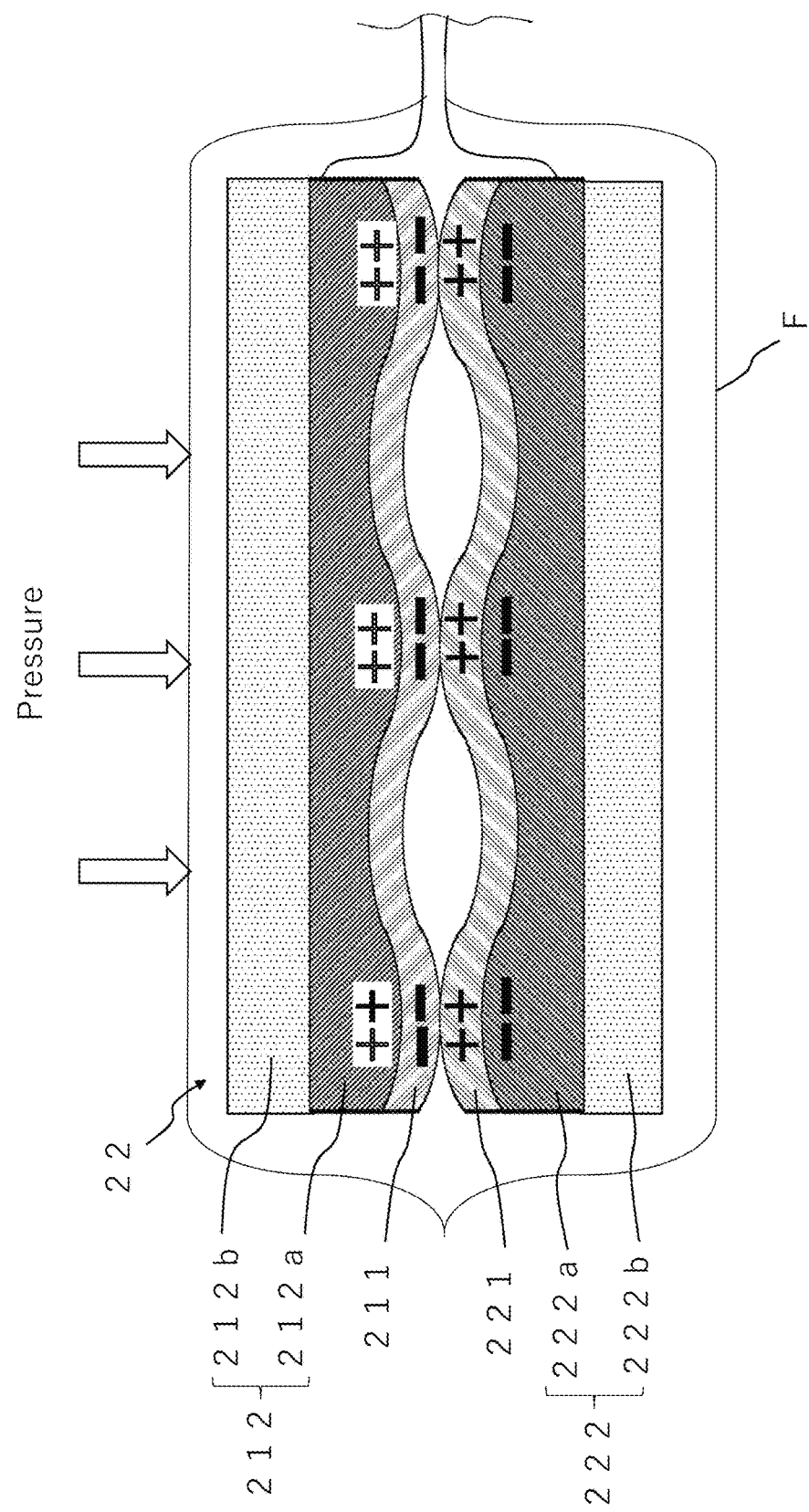
FIG. 6 is a diagram showing an operating principle of the power generating body.

When the tire assembly 20 rotates, a centrifugal force is applied to the sensor module 28, and the power generating body 22 is pressed against the inner side surface of the tread portion 260 from the first electrode 212 side. In this manner, pressure is applied to the power generating body 22 such that the first insulating film 211 and the second insulating film 221 approach each other. As a result, the uneven shapes of the first surface 210 and the second surface 220 deform into a flatter shape than in a state where the tire assembly 20 is stationary, and the true area of contact increases (see FIG. 6). With a tubeless tire, when the power generating body 22 is pressed using a weight, the change in the true area of contact due to the above-described deformation of the tire 26 is larger than in the case where the power generating body 22 is not pressed. As a result, a charge amount that is induced can be made larger than in the case where the power generating body 22 is not pressed. Note that, as will be described later, a voltage V output by the power generating body 22 is proportional to the square of a mass m of a weight.

Power output by the power generating body 22 while the vehicle 1 is travelling is supplied to the air pressure sensor 21, the microcontroller 23, and the communication apparatus 25, and serves as power to drive them. In the present embodiment, power output by the power generating body 22 is stored in the storage battery 24. Thus, it is possible to also drive the air pressure sensor 21, the microcontroller 23, and the communication apparatus 25 using power stored in the storage battery 24 while the vehicle 1 is stopped.

4. Operations of Monitoring System

Hereinafter, operations of the tire monitoring system 100 according to the present embodiment will be described with reference to the drawings. Examples of monitoring a tire according to the present embodiment includes monitoring using the air pressure sensor 21 and monitoring utilizing data regarding voltage output by the power generating body 22. A target to be monitored using the air pressure sensor 21 is the air pressure of the inner portion of the tire 26. On the other hand, a target to be monitored using the power generating body 22 is the rotational speed of the tire 26 (or the tire assembly 20), the abrasion of the tire 26, and the state of a road on which the vehicle 1 is travelling, for example. The system 100 may be configured to start monitoring processing below when the power source of the control apparatus 30 is turned ON, and stop monitoring processing when a certain time period has elapsed from when the vehicle 1 is stopped.

4-1. Air Pressure Monitoring

In air pressure monitoring, each air pressure sensor 21 detects the air pressure of the inner portions of the tires 26 of the tire assemblies 20a to 20d. The pieces of data regarding the detected air pressures of the tire assemblies 20a to 20d are respectively temporarily stored in the storage units of the microcontrollers 23 of the tire assemblies 20a to 20d, and are transmitted to the control apparatus 30 via the communication apparatus 25 at predetermined time intervals. A data transmission interval may be set to one transmission/40 seconds, for example.

The control apparatus 30 receives the data regarding the air pressures of the tire assemblies 20a to 20d that are periodically transmitted from the communication apparatuses 25. IDs for identifying the air pressure sensors 21 of the tire assemblies 20a to 20d are stored in the ROM 36 or the storage device 38 in advance. On the other hand, the data regarding air pressures includes IDs for identifying the air pressure sensors 21 included in the tire assemblies 20a to 20d, and the control apparatus 30 can associate four pieces of data with the tire assemblies 20a to 20d by performing ID verification. When data is received, the arithmetic unit 32 acquires the air pressures of the tire assemblies 20a to 20d from these pieces of data, and compares the air pressures with a pressure reduction threshold stored in the ROM 36 or the storage device 38 in advance. A pressure reduction threshold may be an air pressure at which it is determined that the pressure of a tire has decreased when a detected air pressure is less than the pressure reduction threshold. Alternatively, the pressure reduction threshold may be defined as the air pressure that has decreased from the initial air pressure of a tire stored in the storage device 38 or the like by a predefined pressure reduction ratio. The arithmetic unit 32 determines that the pressure of a tire is normal if data regarding the detected air pressure indicates that the air pressure is the pressure reduction threshold or more, and that the pressure of a tire has decreased (abnormal) if data regarding the detected air pressure indicates that the air pressure is less than the pressure reduction threshold.

If a determination made by the arithmetic unit 32 is "normal", the controller 33 causes the arithmetic unit 32 to repeat similar processing, with regard to the next piece of data received from the communication apparatus 25. On the other hand, if a determination made by the arithmetic unit 32 is "abnormal", the controller 33 outputs a pressure reduction warning via the display device 40 or the like to inform a user.

4-2. Monitoring Using Power Generating Body

With monitoring using the power generating body 22, the power generating body 22 is utilized as a sensor configured to detect information regarding the tire 26. In the present embodiment, information regarding the rotational speed of the tire 26, the abrasion of the tire 26, and the state of a road on which the vehicle 1 is travelling is acquired utilizing data regarding a voltage output by the power generating body 22 during rotations of the tire assembly 20.

A voltage V output by the power generating body 22 changes according to a temporal change in the true area of contact A between the first surface 210 and the second surface 220. More specifically, the larger a temporal change (dA/dt) in A is, the larger the absolute value of V is in proportion to the temporal change. In particular, when the power generating body 22 rotates on a road surface via the tread portion 260 (when the power generating body 22 is approximately closest to the road surface at the lowest position), (dA/dt) is large. At this time, the power generating body 22 is subjected to resistance from the road surface via the tread portion 260 at the same time as it is subjected to pressure from the sensor module 28, and the power generating body 22 deforms significantly. Thus, when the tire assembly 20 rotates at an approximately constant rotational speed, time-series data regarding the voltage V indicates a pulse waveform in which positive peaks and negative peaks appear at a certain cycle.

Figure 7:
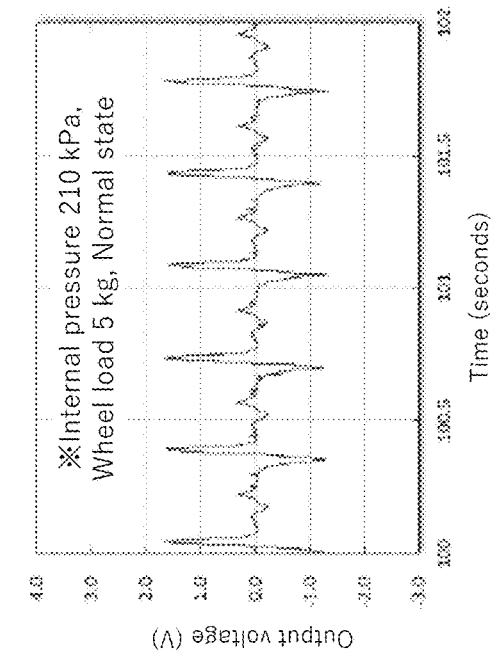
FIGS. 7A-D are graphs of voltages output by the power generating body.
Figure 7:
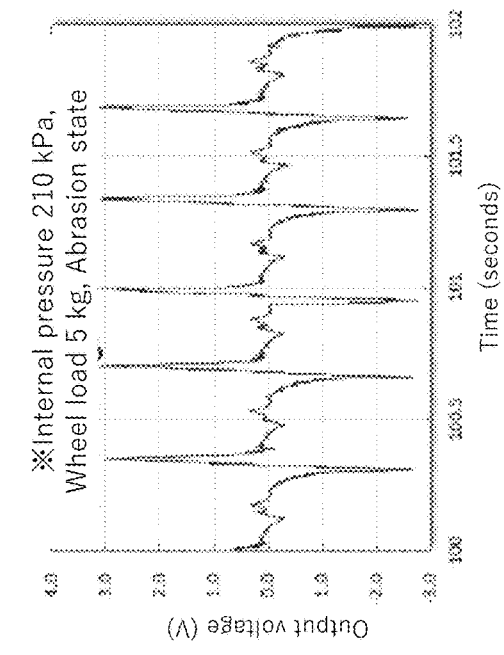
Figure 7:
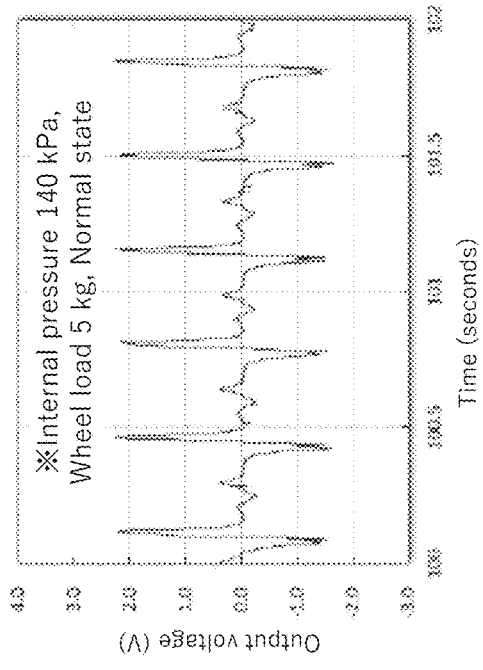
Figure 7:
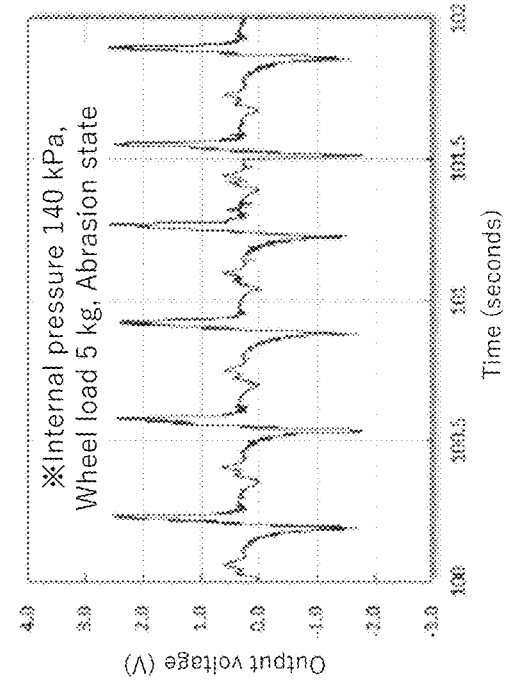
Figure 8:
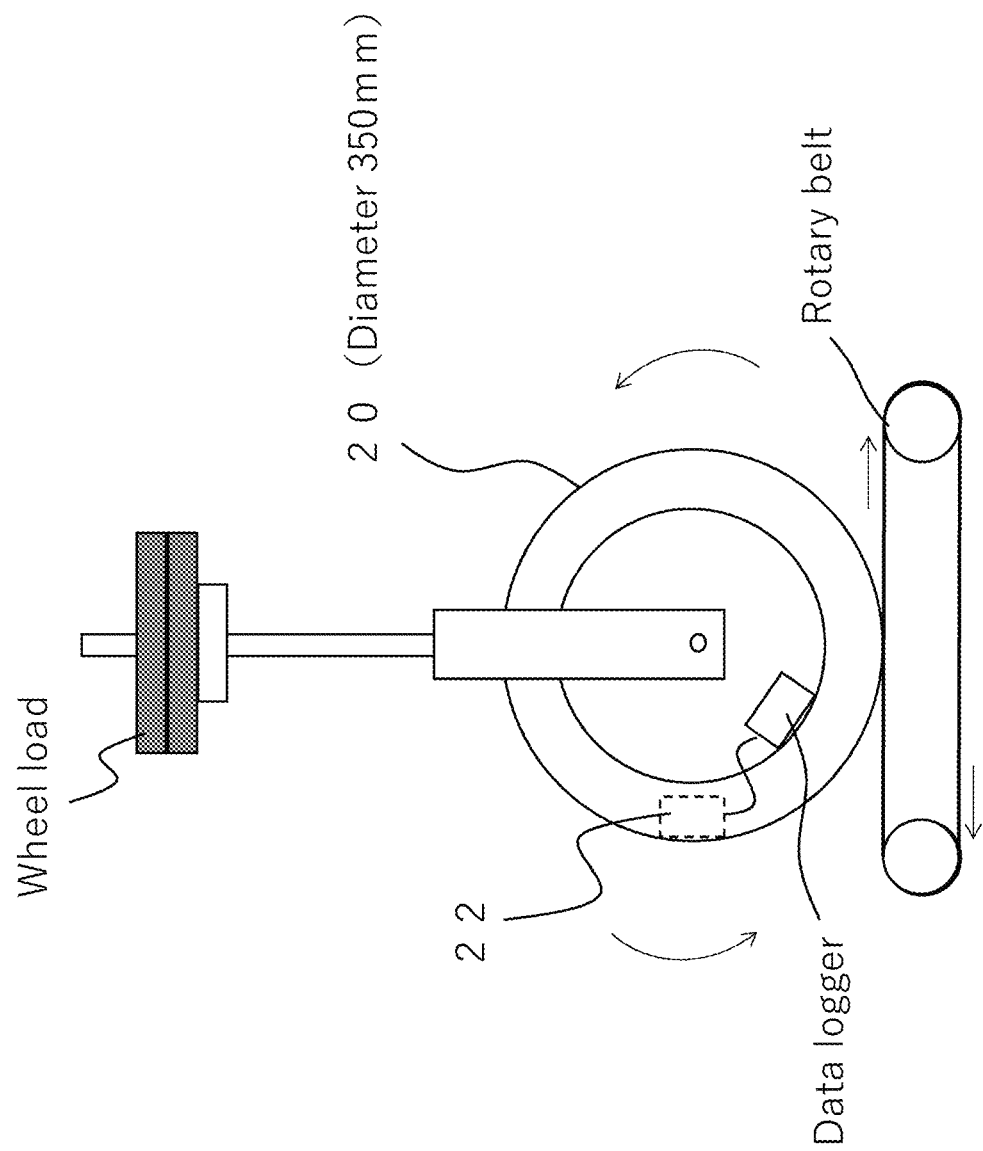
FIG. 8 is a diagram showing a configuration of an experimental apparatus using a tire assembly.

FIGS. 7A to 7D show experimental data supporting this fact. In an experiment, two types of tire assemblies, that is, a tire assembly 20 in a normal state where the tire 26 has not abraded, and a tire assembly 20 in a state where the tire 26 has abraded, were prepared (note that it is determined that a tire with slip markers was in an abraded state). Each of the tire assemblies 20 is incorporated in a unicycle as shown in FIG. 8, and with regard to a case where the internal pressure is 140 (kPa) and a case where the internal pressure is 210 (kPa), the tire assembly 20 was rotated at a certain speed using a rotary belt and the voltage V output by the power generating body 22 was measured. Note that the tire 26 included a tube tire, the first insulating film 211 was made of PU, and the second insulating film 221 was made of FEP. The base material 212b of the first electrode 212 was silicone rubber, and the conductive film 212a was a copper foil tape. On the other hand, the second electrode 222 did not include the base material 222b, and was constituted by the conductive film 222a that is a copper foil tape. As shown in FIGS. 7A to 7B, the waveform of the output voltage V was a periodical pulse waveform, regardless of the internal pressure or the occurrence of abrasion of the tire 26. A pulse period T is the time period required for the tire assembly 20 to make one rotation. Thus, by sampling the pulse waveform of V and measuring the period T, a rotational speed w of the tire assembly 20 can be calculated based on Equation (1) below.

$$\omega = 2\pi/T \qquad (1)$$

Figure 9:
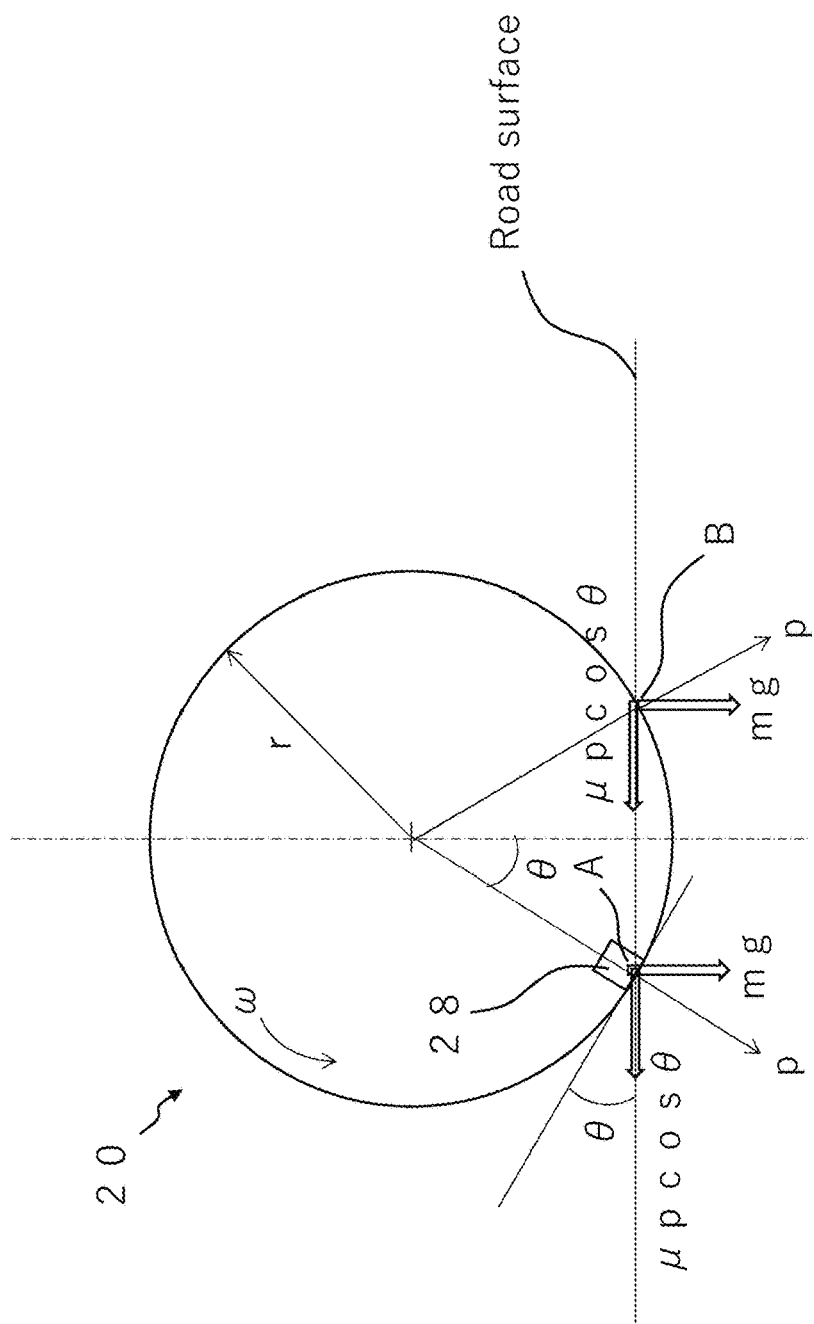

Incidentally, as shown in FIG. 9, a model for forces that act on the power generating body 22 as the tire assembly 20 rotates can be constructed. A coefficient of friction between the road surface and the tire assembly 20 is given $\mu$, a contact angle formed between a tangent line of the tire assembly 20 and the road surface at a point A is given $\theta$, and the mass of the sensor module 28 is given m. Note that the point A is a point at which the power generating body 22 and the sensor module 28 starts to rotate via the tread portion 260 on the road surface. At this time, a centrifugal force p, gravity mg, and a frictional force are applied to the sensor module 28. Thus, forces that act on the sensor module 28 in the horizontal direction and the vertical direction are respectively $\mu p \cos\theta + p \sin\theta$, and $p \cos\theta + mg$. Here, if the fact that when $\theta \ll 1$ holds true, $\cos\theta \approx 1$ and $\sin\theta \approx \theta$ hold true is used, a force Fo applied to the sensor module 28 in the radial direction is calculated based on the following equation.

$$Fo = p + mg + (\mu + \theta)\theta p$$

In the F, a change ΔFo in pressure that the sensor module 28 applies to the power generating body 22 can be expressed as $\Delta Fo=(\mu+\theta)\theta p=(\mu+\theta)\theta mr\omega^2$. Note that r indicates a radius of the tire assembly 20, and $p=mr\omega^2$ holds true.

Herein, it is known that ΔFo and the output voltage V have a relationship where $V \propto \Delta Fo^2$ (V is proportional to ΔFo^2). Thus, Relational Equation (2) below is established between ΔFo and the output voltage V.

$$V \propto (\mu+\theta)^2 \theta^2 m^2 r^2 \omega^4 \quad (2)$$

Similarly, when a point at which the power generating body 22 and the sensor module 28 stop rotating on the road surface via the tread portion 260 is given B, ΔFo at the point B can be expressed as $$\Delta Fo = -(\mu-\theta)\theta p = -(\mu-\theta)\theta mr\omega^2.$$

Thus, a relational equation between ΔFo and the output voltage V is expressed as $$V \propto -(\mu-\theta)^2 \theta^2 m^2 r^2 \omega^4.$$

Figure 10A:
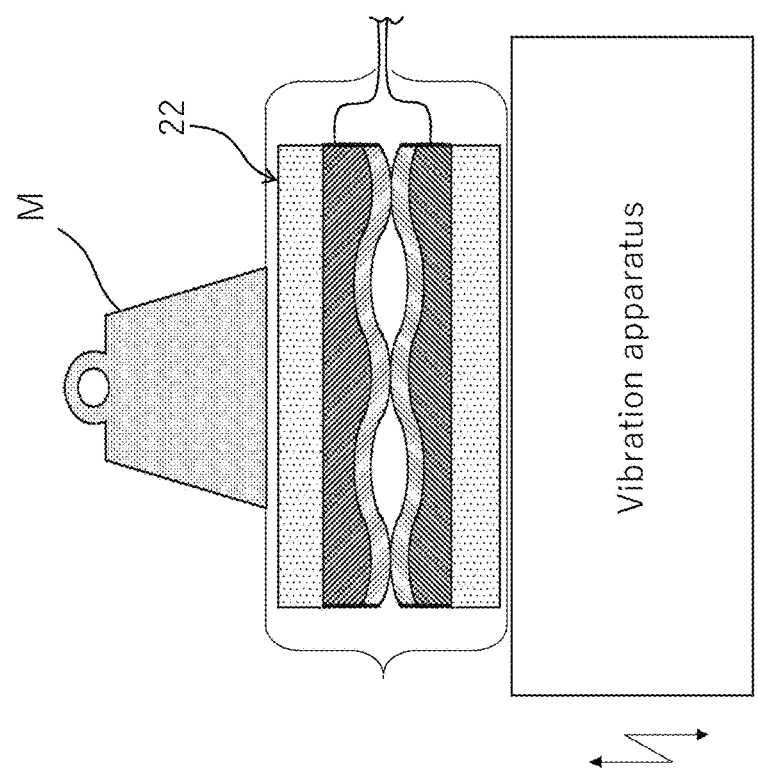
FIG. 10A is a diagram illustrating an experiment using a power generating body.
Figure 10B:
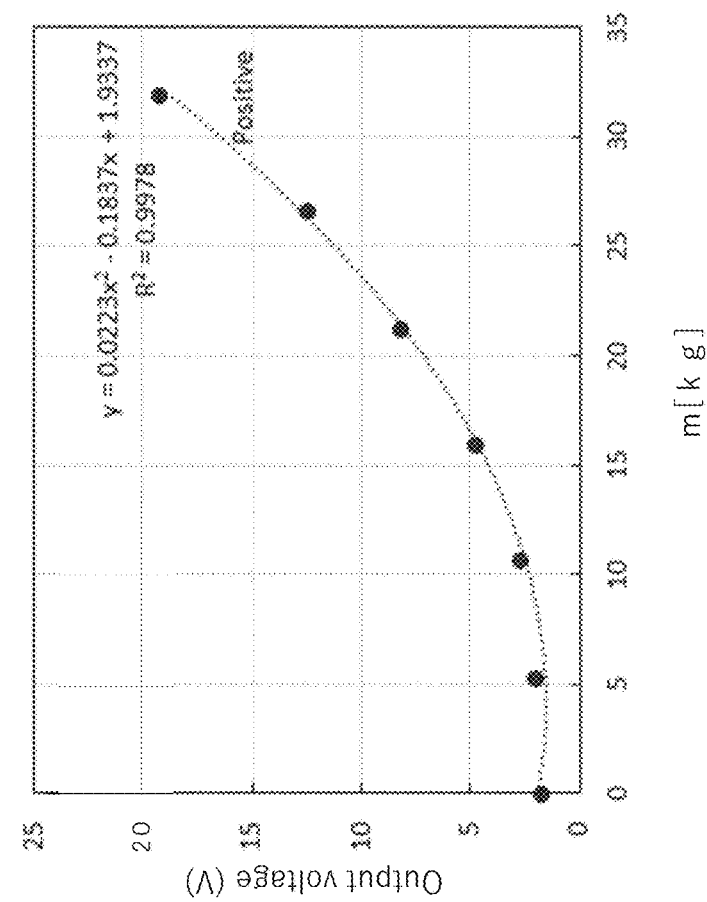
FIG. 10B is a graph of mass of a weight and an output voltage.

According to Equation (2), V changes according to parameters such as the coefficient of friction μ, the contact angle θ, the mass m of the sensor module 28, the radius r of the tire assembly 20, and the rotational speed co of the tire assembly 20. For example, the output voltage V is proportional to the square of the mass m of the sensor module 28 (weight). The inventor of the present invention confirmed this fact through experiments. As shown in FIG. 10A, the power generating body 22 in a state in which the weight M with the mass m was fixed to the upper surface was prepared, and the voltage V output by the power generating body 22 when vibrations of the tire 26 were schematically reproduced using a vibration apparatus was measured. Vibrations had 10 (Hz) and 2 (G). FIG. 10B is a graph obtained by plotting positive peak values of V with respect to the mass m. According to this result, it was confirmed that V is proportional to m2. Thus, it is desired that the tire assembly 20 includes a weight for pressing the power generating body 22, and the larger the mass m of the weight is, the more the voltage V output by the power generating body 22 can be increased.

Figure 11:
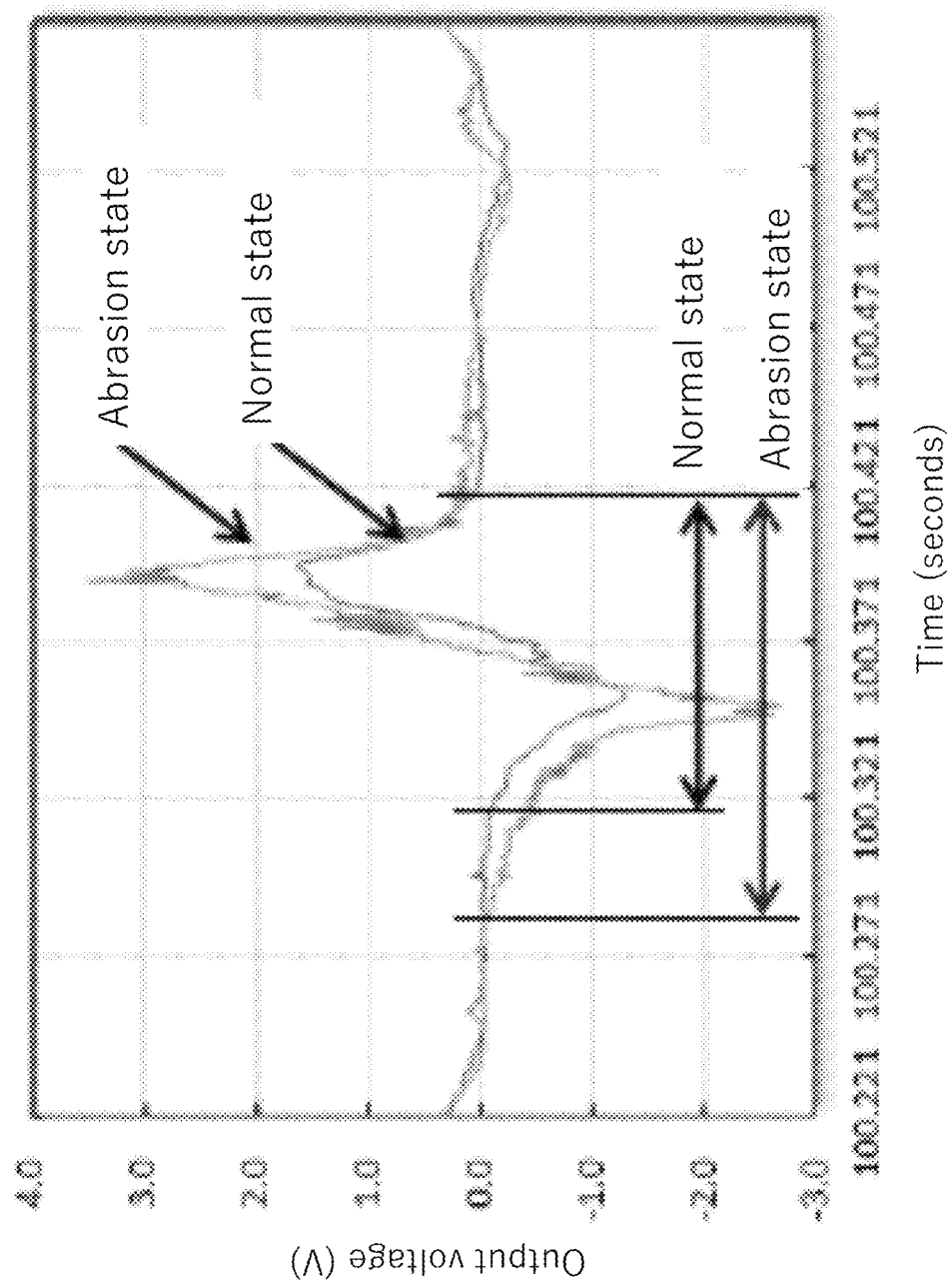
FIG. 11 is a diagram of comparison between an output voltage in a normal state and an output voltage in a friction state.

Incidentally, according to studies conducted by the inventors, it was found that, in the case where the tire 26 is normal and in the case where the tire 26 is abraded, the pulse waveform of V changes even if the conditions of the rotational speed, the internal pressure, and the wheel load are the same. FIG. 11 is a graph comparing pulse waveforms obtained when the tire assembly 20 was rotated once in the normal state and obtained when the tire assembly 20 was rotated once in the abrasion state under the same rotational speed and load conditions (in a method for rotating the tire assembly 20, an apparatus shown in FIG. 8 was used). It is understood that, with the tire assembly 20 in which the tire 26 is in the abrasion state, an absolute value of a peak of the voltage V is larger and a pulse width is longer than with the tire assembly 20 in which the tire 26 is in the normal state. This phenomenon may be utilized to detect abrasion of the tire 26. For example, the waveform of the voltage V output from the power generating body 22 of the tire assembly 20 when usage is started is stored, and as a result of periodically comparing the stored waveform with the waveform of V acquired while the vehicle 1 is travelling, the abrasion of the tire 26 may be detected.

Also, according to Equation (2), because the output voltage V depends on the coefficient of friction μ and the contact angle θ of the road surface on which the vehicle 1 is travelling, the output voltage V reflects the state of the road surface on which the vehicle 1 is travelling. Thus, information regarding the state of the road surface on which the vehicle 1 is travelling can be acquired from data output from the power generating body 22, and monitored. For example, data regarding V in a case where the vehicle 1 is travelling on various road surfaces (asphalt, gravel road, and wet road surface) is stored in the ROM 36 or the storage device 38 in advance, data regarding V acquired while the vehicle 1 is travelling is collated with the stored data, and thus the state of a road surface can be monitored.

As described above, the data regarding V output by the power generating body 22 reflects the rotational speed co of the tire assembly 20, whether or not the tire 26 is abraded, and the state of a road including a road surface on which the vehicle 1 is travelling. The rotational speed w can be calculated from a period of the pulse waveform of V. Also, data regarding V output by the power generating body 22 under various conditions such as air pressure, rotational speed, and the state of a road is stored in the ROM 36 or the storage device 38 in advance, data regarding V acquired while the vehicle 1 is travelling is compared with the stored data, and thus information regarding the tire 26 can be monitored. Hereinafter, a specific operation of the monitoring system 100 including the tire assembly 20 will be described.

When the vehicle 1 travels, the tire assembly 20 rotates on the road surface, and a voltage is generated in the power generating body 22 as described above. The voltage V output by the power generating body 22 while the vehicle 1 is travelling is detected using a detection circuit of the microcontroller 23. The data regarding the output voltage V is sampled in a predetermined period, and temporarily stored in the microcontroller 23. The data regarding V stored in the microcontroller 23 is successively transmitted to the control apparatus 30 via the communication apparatus 25 at predetermined time intervals. The control apparatus 30 receives the data regarding V via the I/O interface 34, and temporarily stores the received data in the RAM 35 or the storage device 38. The arithmetic unit 32 refers to the stored data regarding V, and calculates a period s of the pulse waveform. Also, the arithmetic unit 32 calculates the rotational speed co based on Equation (1). Note that an average value of values calculated a plurality of times may be used as the rotational speed co. Also, it is possible to calculate the rotational speed co using an average value of periods s of a plurality of pulse waveforms. The controller 33 is capable of transmitting the rotational speed co calculated as needed to an ECU or the like of the vehicle 1.

Also, the arithmetic unit 32 compares the data regarding V stored in the ROM 36 or the storage device 38 in advance with the data regarding V that is currently temporarily stored in the RAM 35 or the storage device 38, and determines whether or not the tire 26 is abraded, in parallel to or before or after the above-described processing. If it is determined that the tire 26 is in the normal state, the controller 33 causes the arithmetic unit 32 to repeat similar processing on the piece of data regarding V that is next received by the controller 33. On the other hand, if it is determined that the tire 26 is in the abrasion state, the controller 33 notifies a user of this via the display device 40 or the like to inform the user.

Furthermore, the arithmetic unit 32 compares the data regarding V stored in the ROM 36 or the storage device 38 in advance with the data regarding V that is currently temporarily stored in the RAM 35 or the storage device 38, and determines what kind of state the road surface on which the vehicle 1 is travelling is in, in parallel to or before or after the above-described processing. The determined road surface state may be utilized to control a brake, for example. Also, if the control apparatus 30 is connected to a cloud computing service, data regarding V, the rotational speed co, the abrasion state of the tire 26, and the state of a road surface may be transmitted to the cloud server via the I/O interface 34, and shared with a user of another system 100.

5. Variations

Although one embodiment of the present invention has been described above, the present invention is not limited to the above-described embodiment, and various modifications can be made without departing from the spirit of the invention. For example, the following modifications can be made. Also, variations below can be combined as appropriate.

5-1

Although the tire assembly 20 is monitored based on time-series data regarding the voltage V output by the power generating body 22 in the above-described embodiment, the tire assembly 20 may be monitored based on time-series data regarding another physical quantity such as a current or power flowing through the electric circuit to which the power generating body 22 is connected.

5-2

The first surface 210 and the second surface 220 each have an uneven shape in the above-described embodiment. However, the power generating body 22 may be configured such that only one of the first surface 210 and the second surface 220 has an uneven shape.

5-3

The first electrode 212 may be formed by weaving conductive fibers into the form of fabric. Examples of fibers include a flexible Cu wire and stainless steel wire. Furthermore, the outer circumferential surface of the fiber may be covered by the first insulating film 211. Similarly, the second electrode 222 may be formed by weaving conductive fibers into the form of fabric. Examples of fibers include a flexible Cu wire and stainless steel wire. Furthermore, the outer circumferential surface of this fiber may be covered by the second insulating film 221.

5-4

In the above-described embodiment, both the first electrode 212 and the second electrode 222 respectively include the base material 212b and the base material 222b that are made of a flexible material. However, only one of the first electrode 212 and the second electrode 222 may include a flexible base material.

5-5

The power generating body 22 may include a plurality of the first insulating films 211, a plurality of the second insulating films 221, a plurality of the first electrodes 212, and a plurality of the second electrodes 222. For example, a configuration may be adopted in which the first electrode 212, the first insulating film 211, the second insulating film 221, the second electrode 222, the second insulating film 221, the first insulating film 211, and the first electrode 212 are stacked in the stated order from the top.

5-6

Although the control apparatus 30 was an in-vehicle apparatus in the above-described embodiment, the control apparatus 30 may be a portable device on which the program 37 has been installed, such as a smartphone, a tablet, or a laptop. At this time, a display of the above-described device may also be used as the display device 40. Alternatively, the microcontroller 23 in the tire assembly 20 may directly communicate with an external apparatus on which the program 37 has been installed, such as a cloud server, without communicating with an in-vehicle apparatus.

5-7

There is no limitation on the detection method of the air pressure sensor 21 as long as the air pressure of the inner portion of the tire 26 can be detected. For example, strain gauge type, diaphragm type, and semiconductor type sensors may be used. Also, the sensor 21 is not limited to an air pressure sensor configured to detect the internal pressure of the tire 26, and may be a temperature sensor configured to detect the temperature of an inner portion of the tire 26, or a vibration detection sensor (acceleration sensor) configured to detect vibrations of the tire 26, for example.

5-8

Information regarding the state of a road on which the vehicle 1 is travelling is not limited to information regarding a state of a road surface, and may be information regarding a state of the ground.

5-9

The tire assembly 20 comprises the storage battery 24 as a part of the sensor module 28 in the above-described embodiment. However, the tire assembly 20 may comprise the storage battery 24 independently of the sensor module 28. In this case, the storage battery 24 may be positioned on an upper surface of the power generating body 22, thus the storage battery 24 functions as a weight that presses the power generating body 22 such that the first insulating film 211 and the second insulating film 221 approach each other.

LIST OF REFERENCE NUMERALS

1 Vehicle
100 Monitoring system
20 (20a to 20d) Tire assembly
21 Air pressure sensor
22 Power generating body
23 Microcontroller
24 Storage battery
25 Communication apparatus
26 Tire
28 Sensor module
30 Control apparatus
210 First surface
211 First insulating film
212 First electrode
220 Second surface
221 Second insulating film
222 Second electrode
F Film bag
M Weight
V Output voltage
U flexible sealing material

What is claimed is:
1. A tire assembly comprising:
a tire configured to be mounted on a wheel;
a power generating body that is disposed inside the tire; and
an electronic device configured to receive supply of power that is output from the power generating body,
wherein the power generating body includes
a first insulating film having a first surface,
a second insulating film having a second surface that faces the first surface and is in contact with the first surface,
a first electrode that has conductivity and is in contact with a back surface of the first surface of the first insulating film, and a second electrode that has conductivity and is in contact with a back surface of the second surface of the second insulating film, the power generating body is configured such that a true area of contact between the first surface and the second surface changes according to deformation of the tire, the first insulating film and the second insulating film are configured such that one of the first insulating film and the second insulating film is positively charged and the other of the first insulating film and the second insulating film is negatively charged due to the true area of contact changing, and a voltage is generated across the first electrode and the second electrode due to the first insulating film and the second insulating film being charged, and the power generating body outputs power.

2. The tire assembly according to claim 1,
wherein the electronic device includes a communication apparatus that is configured to transmit data to an external apparatus.

3. The tire assembly according to claim 2,
wherein the electronic device includes a detection apparatus configured to detect data regarding a state of the tire.

4. The tire assembly according to claim 2,
wherein the electronic device includes a microcontroller configured to control the electronic device.

5. A tire monitoring system comprising:
the tire assembly according to claim 2; and
an external control apparatus configured to receive data from the communication apparatus,
wherein the communication apparatus transmits, to the external control apparatus, at least one piece of output data of a voltage and a current that are output by the power generating body, and a physical quantity that is based on at least one of the voltage and the current, and
the external control apparatus monitors information regarding the tire based on the output data received from the communication apparatus.

6. The tire monitoring system according to claim 5,
wherein the information regarding the tire includes at least one of information regarding a rotational speed of the tire, information regarding abrasion of the tire, and information regarding a state of a road on which a vehicle on which the tire is mounted is travelling.

7. The tire monitoring system according to claim 6,
wherein the external control apparatus is installed in a vehicle that includes the tire assembly.

8. The tire monitoring system according to claim 5,
wherein the external control apparatus is installed in a vehicle that includes the tire assembly.

9. A tire monitoring method comprising:
preparing a vehicle on which the tire assembly according to claim 2 is mounted;
collecting at least one piece of output data of a voltage and a current that are output by the power generating body while the vehicle is travelling, and a physical quantity that is based on at least one of the voltage and the current; and
monitoring information regarding the tire based on the collected output data.

10. The tire assembly according to claim 1,
wherein the electronic device includes a detection apparatus configured to detect data regarding a state of the tire.

11. The tire assembly according to claim 10,
wherein the electronic device includes a microcontroller configured to control the electronic device.

12. The tire assembly according to claim 1,
wherein the electronic device includes a microcontroller configured to control the electronic device.

13. The tire assembly according to claim 1, further comprising:
a dampproof film bag in which the power generating body is enclosed.

14. The tire assembly according to claim 1, further comprising
a flexible sealing material in which the power generating body is enclosed.

15. The tire assembly according to claim 1, further comprising:
a storage battery configured to store power that is output by the power generating body,
wherein the electronic device receives supply of power stored in the storage battery.

16. The tire assembly according to claim 15,
wherein the storage battery is disposed to press the power generating body such that the first insulating film and the second insulating film approach each other.

17. The tire assembly according to claim 1, further comprising:
a weight that is disposed to press the power generating body such that the first insulating film and the second insulating film approach each other.

18. The tire assembly according to claim 1,
wherein the electronic device is disposed to press the power generating body such that the first insulating film and the second insulating film approach each other.

19. A tire monitoring method comprising:
preparing a vehicle on which the tire assembly according to claim 1 is mounted;
collecting at least one piece of output data of a voltage and a current that are output by the power generating body while the vehicle is travelling, and a physical quantity that is based on at least one of the voltage and the current; and
monitoring information regarding the tire based on the collected output data.

* * * * *